(12) United States Patent
Zatelman et al.

(10) Patent No.: US 7,774,511 B2
(45) Date of Patent: Aug. 10, 2010

(54) ADDRESSING MULTIPLE DEVICES ON A SHARED BUS

(75) Inventors: Yosi Zatelman, Karmiel (IL); Asher Druck, Nahariya (IL); Giora Ariel, Givat Ella (IL)

(73) Assignee: SanDisk IL Ltd., Kfar Saba (IL)

( * ) Notice: Subject to any disclaimer, the term of this patent is extended or adjusted under 35 U.S.C. 154(b) by 282 days.

(21) Appl. No.: 11/927,108

(22) Filed: Oct. 29, 2007

(65) Prior Publication Data

US 2009/0100198 A1 Apr. 16, 2009

Related U.S. Application Data

(60) Provisional application No. 60/979,372, filed on Oct. 11, 2007.

(51) Int. Cl.
*G06F 3/00* (2006.01)
*G06F 13/00* (2006.01)
(52) U.S. Cl. ............... 710/9; 710/10; 710/107
(58) Field of Classification Search .......... 710/9, 710/10, 107
See application file for complete search history.

(56) References Cited

U.S. PATENT DOCUMENTS

| | | | |
|---|---|---|---|
| 4,964,038 A | 10/1990 | Louis et al. ................. 710/9 |
| 5,204,669 A | 4/1993 | Dorfe et al. ............ 340/825.52 |
| 5,404,460 A * | 4/1995 | Thomsen et al. ............ 710/9 |
| 6,163,823 A | 12/2000 | Henrikson .................. 710/100 |
| 6,189,059 B1 | 2/2001 | Sotek et al. ................. 710/104 |
| 6,209,022 B1 | 3/2001 | Sotek et al. ................. 709/209 |
| 7,228,363 B1 | 6/2007 | Wehrle et al. ................ 710/10 |
| 2002/0188781 A1* | 12/2002 | Schoch et al. ............... 710/107 |
| 2004/0133704 A1* | 7/2004 | Krzyzanowski et al. ..... 709/250 |

FOREIGN PATENT DOCUMENTS

WO WO 02/15020 2/2002

OTHER PUBLICATIONS

International Search Report dated Dec. 4, 2008 in PCT Application No. PCT/US2008/078834.
Written Opinion dated Dec. 4, 2008 in PCT Application No. PCT/US2008/078834.

\* cited by examiner

*Primary Examiner*—Henry W Tsai
*Assistant Examiner*—Tushar S Shah
(74) *Attorney, Agent, or Firm*—Beyer Law Group LLP

(57) ABSTRACT

Assigning addresses to legacy sharing at least one signal line with a plurality of client devices. Each of the devices includes a number of I/O pins selected ones of which are connected to the at least one signal line and each client device includes a first and a second initialization pin. In the described embodiment, all but a first one of the plurality of client devices are connected to one another in a daisy chain arrangement by way of the first and the second initialization pin separate from the signal line. A first client device has a first initialization pin that is independently held at a first logic level and a second initialization pin that is connected to the daisy chain arrangement. The first one of the client devices is initialized and, in turn, triggers initialization of the daisy chained client devices. The legacy device is initialized separately from the client devices.

31 Claims, 4 Drawing Sheets

ADDRESSING MULTIPLE DEVICES ON A SHARED BUS

CROSS REFERENCE TO RELATED APPLICATIONS

This patent application takes priority under 35 U.S.C. 119(e) from U.S. Provisional Patent Application Ser. No. 60/979,372 entitled, "Addressing Multiple Devices on a Shared Bus", by Zatelman et al. filed Oct. 11, 2007, which is also incorporated by reference in its entirety for all purposes.

FIELD OF THE INVENTION

The present invention relates generally to digital devices. More particularly, the present invention relates to a method for assigning addresses to multiple devices on a shared bus.

BACKGROUND

It has become commonplace to connect a host computer to a flexible number of various functional devices (such as storage devices, communications devices, sensing devices, and the like that can be either removable or fixed in nature) using a plurality of conducting wires referred to as a "bus" that typically complies with well known standards. In most situations, the number of conducting wires included in the bus is not the same as the number of devices connected and therefore the number of conducting wires that constitute the bus are shared amongst any and all of the devices connected to the bus. Since all the devices share the same conducting wires within the bus and in order for the host computer to communicate with each of the devices, each device is both assigned a unique address and subsequently programmed to respond only to messages that are addressed to that unique address. In this way, multiple devices can share the same conducting wires that form the bus resulting in a substantially reduced bus size than would be otherwise be required.

Since the host computer typically does not know these addresses prior to initialization, there must be a process of associating each device with a corresponding unique address (also referred to as a session address) for the duration of the communication session. In some devices, such as MultiMediaCard, or MMC, the device addresses are assigned by the host computer as a part of the initialization process. In other devices, such as SecureDigital memory card, or SD, the device addresses are inherent to the device and are sent to the host from the device upon device initialization (it should be noted that in such systems, a replacement mechanism in place at the host computer typically prevents collision between names). Regardless of the type of device, the host computer must to be able to selectively communicate with each device prior to an assignment of the session address.

Unfortunately, however, until addresses are assigned to all the devices, there is no way for the host computer to select any single device out any of the plurality of devices sharing the bus. There have been many attempts at solving this problem, one of which is described in U.S. Pat. No. 5,204,669 (referred hereinafter as the '669 patent) issued to Dorfe that describes a method for associating an address to each of a number of functional devices sharing a bus. However, the method described in the '669 patent requires that the physical structure of the host computer be modified in order to establish a hardware connection between the host computer and a first one of the functional devices. This approach requires substantial modification of the host computer and is therefore not a desirable approach for at least the fact that it would increase the cost and complexity of the host computer. In addition to requiring that the host computer be physically modified, the '669 patent requires that all of the functional devices that share the same bus must be configured in a particular manner in order to successfully function within the framework described in the '669 patent. For example each of the functional devices described in the '669 patent must be able to accommodate control lines 18 and 20 as well as enable return circuitry 30. Therefore any device not so configured (referred to in this discussion as a legacy device) cannot be accommodated in a system constructed along the lines described in the '669 patent.

Another approach is described in U.S. Pat. No. 6,189,059 (hereinafter the '059 patent) and U.S. Pat. No. 6,209,022 (hereinafter the '022 patent), both by Sotek et al., describing a method of associating an address to each of a number of functional devices sharing a bus. The method described by the '059 and '022 patents requires the use of open-drain output circuits to enable all devices to transmit their unique identifiers during initialization. Each device also monitors the bus to see if any other device has pulled the line, i.e., to detect transmissions of others. However the use of open-drain output circuits limits the bus operating frequencies during initialization and cannot be used in systems where open-drain output circuits are not available. Also, it is only possible for devices that have their addresses assigned by the host computer as part of the initialization process and can not be used for devices that have inherent addresses which are sent to the host from each device upon its initialization. In addition, the '059 and '022 patents require that each device listens to the bus during initialization and stops its own transmission when it detects a different transmission of another device being transmitted on the bus. This requires that all devices monitor the initialization process of all other devices without allowing the host to initialize each device separately. Furthermore, the '059 and '022 patents do not accommodate a legacy device that was not designed to share the bus with other devices that were designed along the lines of the '059 and '022 patents.

Therefore, it would be desirable to have a method for communicating with each of the devices on the bus individually and associate it with an address during the initialization process.

SUMMARY OF THE DESCRIBED EMBODIMENTS

According to different embodiments of the present invention, various methods, devices and systems are described for providing addresses to a number of client devices sharing a bus. One embodiment describes a bus architecture that includes at least one signal line and a plurality of client devices. Each of the client devices includes a number of I/O pins selected ones of which are connected to the at least one signal line and each client device also includes a first and a second initialization pin. In the described embodiment, all but a first one of the plurality of client devices are connected to one another in a daisy chain arrangement by way of the first and the second initialization pin separate from the signal line. A first client device has a first initialization pin that is independently held at a first logic level and a second initialization pin that is connected to the daisy chain arrangement. The at least one signal line is connected to a host computer and the first client device is not connected directly to the host computer.

According to another embodiment of the invention, a method of assigning session addresses to a N client devices each having I/O pins and a first and a second initialization pin wherein selected ones of the I/O pins are connected to at least one signal line and wherein a first initialization pin of a first client device is connected to an external circuit and a second initialization pin of the first device is connected to the other N−1 client devices that are, in turn, connected in a daisy chain arrangement by way of the first and the second initialization pins separate from the signal line. The method can be carried out by setting the first initialization pin of the first client device to a first logic level, changing a device status of the first client device to an active status in response to the first logic level such that the first client device can communicate with a host computer connected to the at least one signal line, receiving an initialization command by the first client device, initializing the first client device in response to the received initialization command by determining if the client device has a dedicated device address, then initializing the first client device in response to the received initialization command by designating the dedicated device address as the session address as long as the dedicated session address does not conflict with a previously assigned device address, otherwise, assigning the session address to the client device by the host computer and changing the device status of the initialized first client device to an initialized status in response to the completed initializing, and setting the second initialization pin of the initialized first client device to the first logic level in accordance with the initialized status.

In one aspect of the invention, if a legacy device is sharing the at least one signal line, then the legacy device is assigned a session address separately from any of the client devices.

According to yet another embodiment of the invention, an integrated circuit is described. The integrated circuit includes at least a plurality of I/O pins, a first initialization pin, and a second initialization pin. In the described embodiment, the integrated circuit can be initialized by setting the first initialization pin to a first logic level, changing a device status of the first client device to an active status in response to the first logic level such that the first client device can communicate with an external circuit by way of selected ones of the I/O pins, changing the device status of the integrated circuit to an initialized status when the integrated circuit is initialized in response to a received initialization command. The integrated circuit is initialized by determining if the integrated circuit has a dedicated device address, then initializing the integrated circuit in response to the received initialization command by designating the dedicated device address as a session address as long as the dedicated session address, otherwise, assigning the session address to the client device, and setting the second initialization pin to the first logic level in accordance with the initialized status.

Yet another embodiment of the invention describes a system that includes a host device, at least one signal line connected to the host device, and a plurality of client devices. In the described embodiment, each of the client devices includes at least a number of I/O pins selected ones of which are connected to the at least one signal line, and a first and a second initialization pin wherein all but a first of the plurality of client devices are connected to one another in a daisy chain arrangement by way of the first and the second initialization pin separate from the at least one signal line, wherein the first client device is directly connected to the daisy chain arrangement by way of the second initialization pin and wherein the first initialization pin of the first device is not connected directly to the host computer and is independently held at a first logic level such that the first one of the plurality of client devices is always able to communicate with an external circuit connected to the at least one signal line.

Another embodiment describes a method of initializing a legacy device and N client devices each having I/O pins selected ones of which are connected to at least one signal line that is connected to a host computer, wherein only the N client devices each have a first and a second initialization pin and wherein a first initialization pin of a first client device is not connected directly to the host computer and is held independently at a first input level and a second initialization pin of the first device is connected to the other N−1 client devices that are, in turn, connected in a daisy chain arrangement by way of the first and the second initialization pins separate from the signal line. The method can be carried out by initializing the legacy device separately from any of the N client devices.

A method of initializing a legacy device and N client devices each having I/O pins selected ones of which are connected to at least one signal line, wherein only the N client devices each have a first and a second initialization pin and wherein a first initialization pin of a first client device is connected to an external node and a second initialization pin of the first device is connected to the other N−1 client devices that are, in turn, connected in a daisy chain arrangement by way of the first and the second initialization pins separate from the signal line is described. The method is carried out by initializing the legacy device and initializing the N client devices in any order.

DETAILED DESCRIPTION OF THE DRAWINGS

FIG. 1 shows a simplified wiring diagram of a system according to the present invention.

FIG. 2 graphically illustrates various client device states during system reset and initialization of system of FIG. 1.

DETAILED DESCRIPTION OF THE DESCRIBED EMBODIMENTS

Reference will now be made in detail to a particular embodiment of the invention an example of which is illustrated in the accompanying drawings. While the invention will be described in conjunction with the particular embodiment, it will be understood that it is not intended to limit the invention to the described embodiment. To the contrary, it is intended to cover alternatives, modifications, and equivalents as may be included within the spirit and scope of the invention as defined by the appended claims.

The present invention describes a system, method and apparatus for addressing multiple devices that share a common bus such that each device can respond to a directed request(s) from a host computer. The client devices are electrically connected to one another in such a way that signals can flow between neighboring devices independently of the bus and/or the host computer. Usually, but not always, such a connection is feasible since the devices are typically physically close to each other and can be therefore be connected together by way of soldered conductors or via pins and sockets, and the like.

Embodiments of the invention are discussed below with reference to FIGS. 1-4. However, those skilled in the art will readily appreciate that the detailed description given herein with respect to these figures is for explanatory purposes as the invention extends beyond these limited embodiments.

Figure 1:
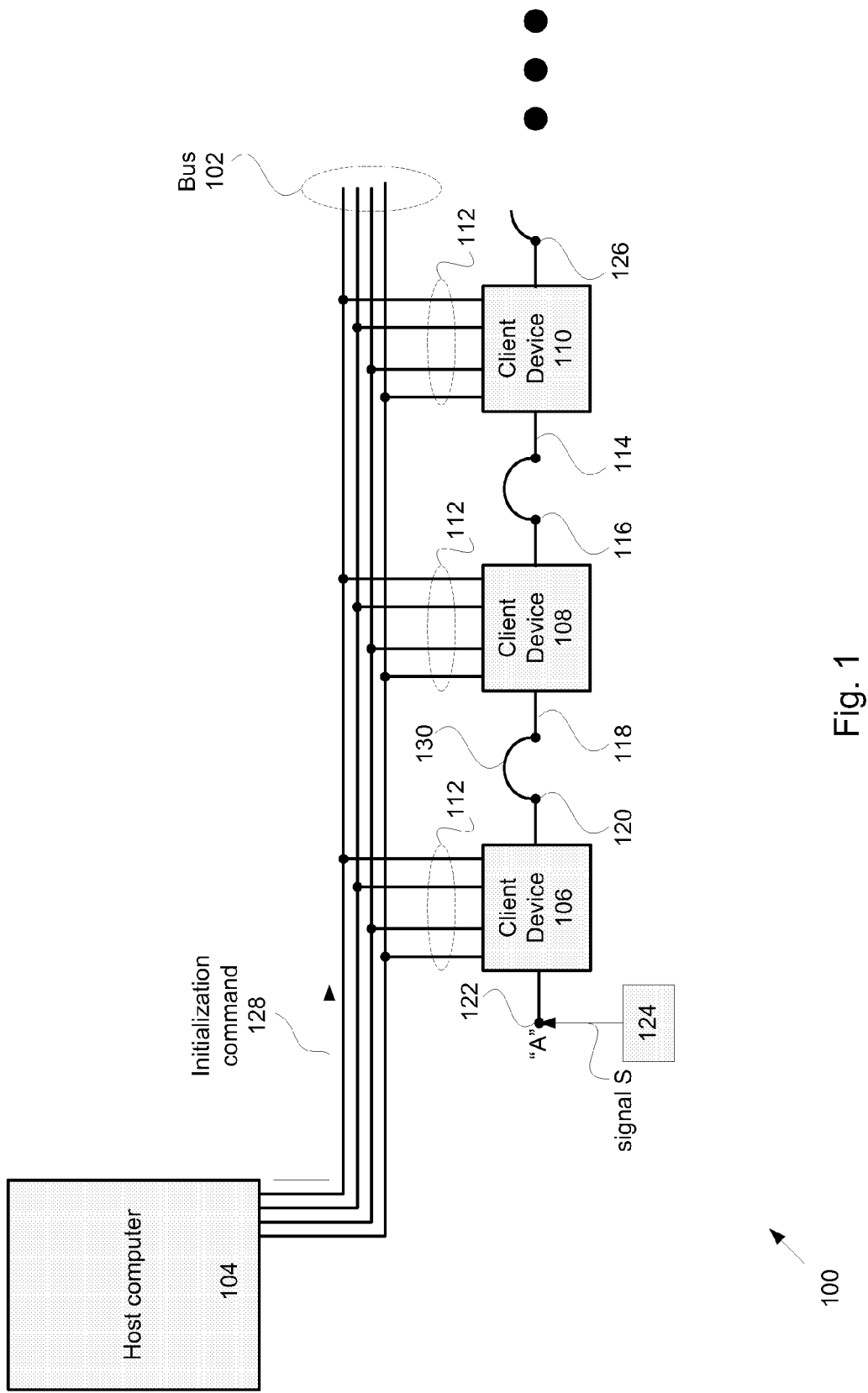

Accordingly, FIG. 1 shows a simplified wiring diagram of a system 100 according to the present invention. The system 100 includes a number of signal lines 102 (referred to as bus 102) used to connect a host computer 104 to a plurality of client devices 106, 108, and 110. It should be noted that even though only three client devices (106, 108 and 110) are shown, it can be appreciated that there can be any number of client devices in system 100. Each of the client devices includes a number of I/O pins 112 selected ones of which are used to electrically connect an associated one of the client devices to bus 102. In addition to I/O pins 112, each client device includes first and second initialization pins that are used to connect client devices 106, 108 and 110 in a daisy chain arrangement separate from bus 102. By daisy chain arrangement, it is meant that a first pin of one client device is electrically connected to a second pin of a neighboring client device. The connection can be either by hard soldering, by a printed circuit layout or by connection of socket pins. For example, first initialization pin 114 of client device 110 can be connected to second initialization pin 116 of client device 108 and first initialization pin 118 of client device 108 can be connected to second initialization pin 120 of client device 106. Unlike the other client devices, however, first initialization pin 122 of client device 106 can be connected to an external node that in turn can be connected to signal source 124 that independently generates a signal S that provides a logic level A at first initialization pin 122.

After system 100 is powered up and/or reset, each client device undergoes an initialization procedure during which each client device is programmed to recognize one of three states (a first or inactive state, a second or active state, and a third or initialized state) and to behave in accordance with that state. The first state indicates that the client device has not yet been yet initialized and as such is not allowed to communicate with host computer 104, whereas the second state indicates that the client device is in the process of being initialized and can communicate with the host computer 104 as needed. The third state indicates that the client device has completed the initialization procedure is thus initialized and can communicate with host computer 104 but only when addressed by the unique address to which it has been assigned (or, in some cases, a client device has instructed the host computer the address to which it will respond).

The client device has been programmed to change its device state (i.e. first to second, second to third, third to first etc.) in accordance with a logic value applied at the first initialization pin. Moreover, the device is programmed to change the logic value applied at the second initialization pin in accordance with the current device status. For example, if the logic value applied at the first initialization pin is logic value A, then the client device is able to communicate with the host computer 104 (i.e., either state two if not initialized or state three if initialized). However, if the device status changes from state two to state three (subsequent to successful initialization, for example) then the client device will change the logic value applied at the second initialization pin from logic level B to logic level A which will, in turn, trigger a next client device in the daisy chain connected thereto to change device status consistent with having logic level A applied to its first initialization pin (and whether or not it has been successfully initialized). It should be noted that the logic value applied to the second initialization pin is only changed after the client device has successfully changed its own status. In this way, until all client devices have been initialized, only one client device at a time is allowed to respond to host computer 104. Furthermore, by appropriately changing device status and updating logic levels applied to the second initialization pin, each client device is able to signal another client device that it is their particular turn to respond to host computer 104 thereby avoiding sending such signals over bus 102 and avoiding unnecessary bus traffic.

Returning to FIG. 1, during power up or system reset, all client devices are inactive (i.e., state 1) and second initialization pins 116, 120, and 126 are set to logic level B. At system start, signal source 124 provides signal S to first initialization pin 122 of client device 106 thereby setting first initialization pin 122 to logic level A. Client device 106 is programmed to respond to the change in logic level at pin 122 by changing its status from previous state 1 to state 2 (all the while maintaining second initialization pin 124 at logic level B). While in state 2, client device 106 is capable of communicating with host computer 104 and therefore is able to respond to first type initialization command 128 sent by host computer 104 by beginning the initialization process. During initialization, host computer 104 assigns a unique address to client device 106 (or, alternatively, client device 106 provides a unique address to host computer 104 to which it will respond). Once client device 106 has completed initializing, client device 106 updates its device status to state 3 and concurrently sets second initialization pin 120 to logic level A that triggers neighboring client device 108 to change states from state 1 to state 2. Since second initialization pin 120 is electrically connected to first initialization pin 118 by way of electrical connection 130, first initialization pin 118 is also set to logic level A bypassing bus 102. Client device 108 responds to the change of input level at pin 118 by updating its device status from state 1 to state 2 thereby enabling client device 108 to communicate with host computer 104. Host computer 104 proceeds to broadcast first type initialization command 128 over bus 102 that can then be received by client device 108 that, in turn, can respond by initializing.

After client device 108 is initialized, client device 108 updates its device status from state 2 to state 3 and concurrently triggers client device 110 to change device status from state 1 to state 2 by setting second initialization pin 116 from logic level B to logic level A that forces initialization pin 114 to also change from input level B to input level A. The process is repeated for client device 110 and for all other client devices (if any) included in the daisy chain until such time as all daisy chained client devices have been initialized. It should be noted that the duration of initialization does not need to be the same for all devices and it is contemplated that the invention is well suited for synchronous as well as asynchronous initialization (where each device can have a different initialization procedure).

In this way, by providing a first client device (in this case client device 106) that is always capable of communicating with host computer 104 whenever system 100 is powered, all client devices connected to bus 102 and included in the daisy chain arrangement can be initialized without requiring special modifications to host computer 104. Furthermore, unlike conventional approaches, the signal path between the daisy chained client devices used to pass triggering signals is separate and distinct from bus 102 and therefore, again unlike conventional approaches, does not consume bus resources that could otherwise be used to pass information and/or data between the client devices and host computer 104.

Figure 2:
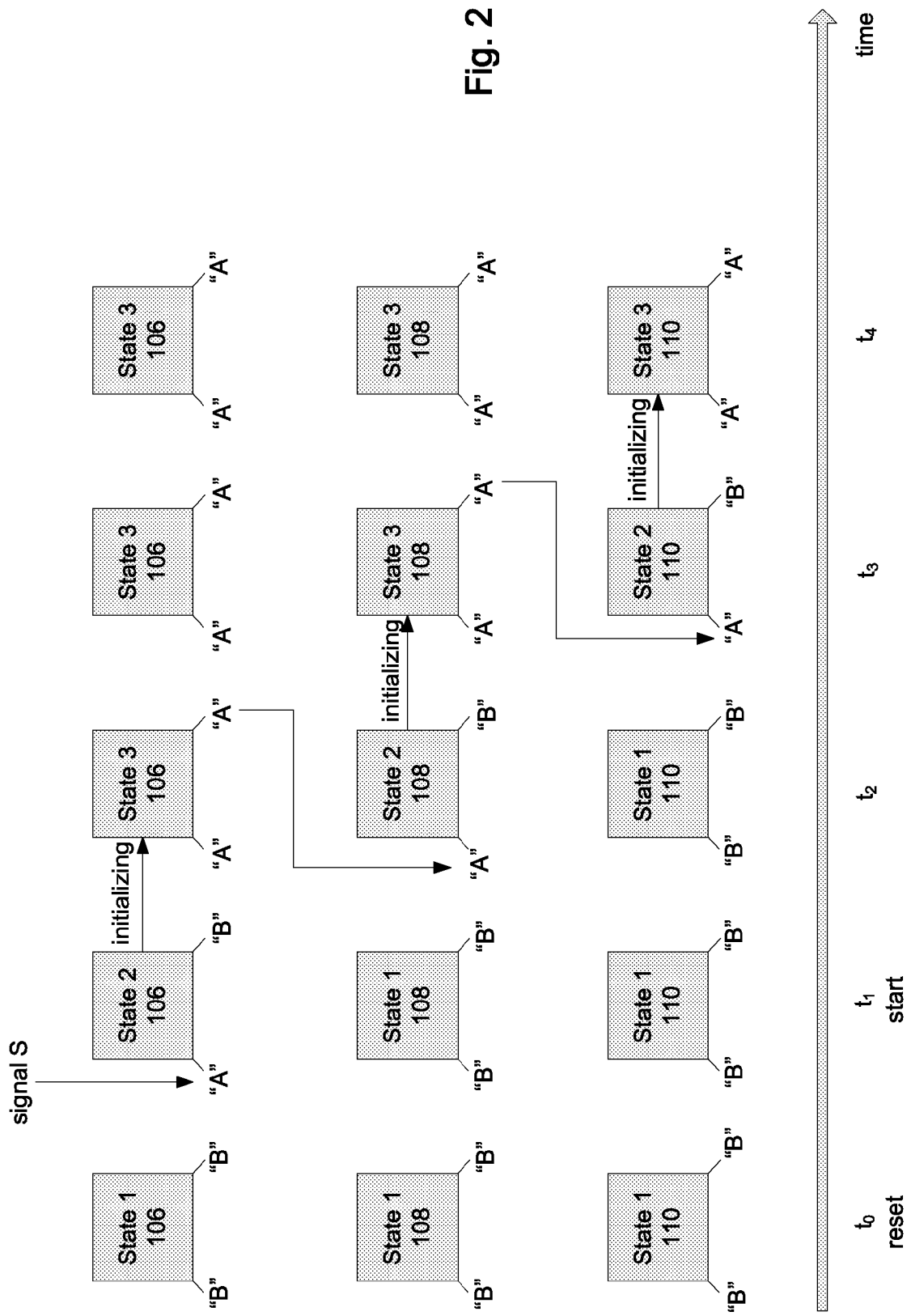

FIG. 2 graphically illustrates various client device states during system reset and initialization of system 100. System 100 is initially shown at time t=0 at reset with all devices (106, 108, and 110) in state 1 and all initialization pins at logic level B (it should be noted that first initialization pin 122 can be tri-stated or simply left open at this point). At time $t=t_1$, system 100 is started at which time first initialization pin 122 of client device 106 is set to logic level A and client device 106 immediately changes to state 2 at which point it can now communicate with host computer 104. Host computer 104 broadcasts first type initialization command 128 over bus 102 which is received and recognized by client device 106 as an initialization command. It should be noted that client device 106 is the only client device at this point that can communicate with host computer 104 since all other client devices sharing bus 102 are in state 1. Client device 106 completes initialization at time $t=t_2$, changes to state 3 at which point client device 106 can still communicate with host computer 106 but only if requests are specifically directed at the address now assigned to client device 106. Therefore, any subsequent initialization commands sent over bus 128 are ignored by client device 106 since initialization commands are not sent to a specific address.

Once client device 106 has changed its device status to state 3, client device 106 triggers client device 108 to change its state from state 1 to state 2 by setting second initialization pin 120 to logic level A from logic level B. This change in logic level is transmitted over electrical connection 130 to first initialization pin 118 bypassing bus 102 causing client device 108 to change from state 1 to state 2 thereby enabling client device 108 to communicate with host computer 104. As previously with client device 106, host computer 104 broadcasts first type initialization command 128 over bus 102 which only client device 108 can respond (since client device 106 ignores any requests that are not sent to the address assigned to client device 106 and client device 110 still remains in state 1) by initializing. Once client device 108 has completed initializing at time $t=t_3$, client device 108 has been assigned an address by host computer 104 (or has provided an address to host computer 104 in some cases) and will henceforth ignore any requests not specifically directed at that address. Furthermore, client device 108 changes its state from state 2 to state 3 and sets second initialization pin 116 at logic level A from logic level B. As with client device 106 triggering client device 108, the change in logic levels is communicated to first initialization pin 114 without using any bus resources and triggers client device 110 to change its state from state 1 to state 2. Client device 110 can now communicate with host computer 104 and respond to first type initialization command 128 broadcast by host computer 104. Client device 110 is now the only client device capable of responding to first type initialization command 128 to which client device 110 responds by initializing. At time $t=t_4$, client device 110 has completed initialization and changes its state from state 2 to state 3 and sets second initialization pin 126 to logic level A. At this point, all of the client devices included in system 100 have been initialized.

Figure 3:
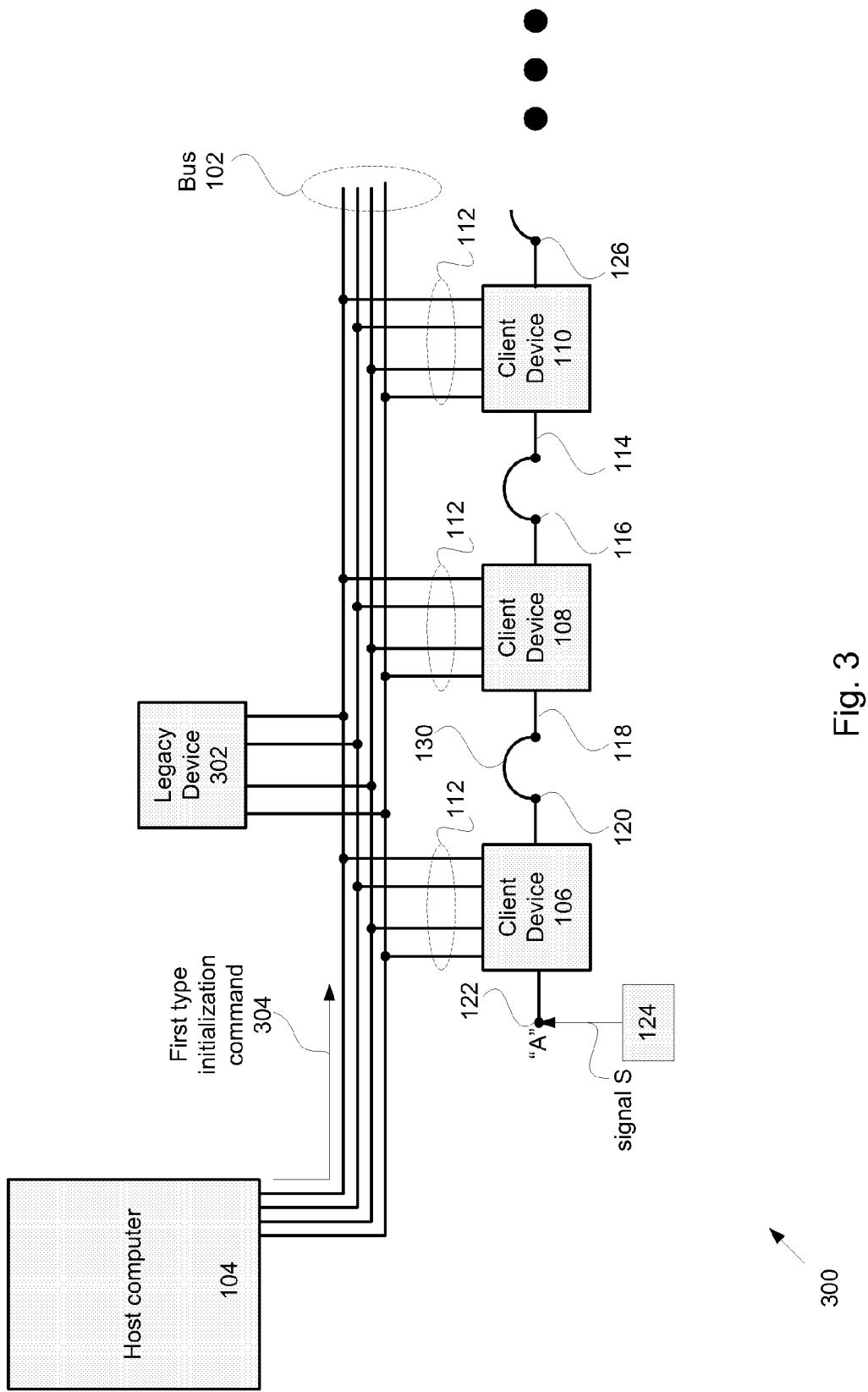
FIG. 3 shows a system in accordance with another embodiment of the present invention.

FIG. 3 shows system 300 in accordance with another embodiment of the present invention. It should be noted that system 300 is substantially the same as system 100 except for the addition of what is referred to as legacy device 302 that shares bus 102 with client devices 106-110. In the context of this discussion, legacy device 302 is any device capable of connecting to and otherwise sharing bus 102 with client devices 106-110 but is not, however, equipped with any initialization pins. In other words, by simply modifying operating code of host computer 104 or by providing host computer 104 with the ability to discern if any legacy devices are connected to bus 102, the invention can be used with system having at least one legacy device or no legacy devices by only making simple software or operating system modifications without resorting to hardware modifications. This advantage substantially improves the ability of the invention to be used with any device even those devices not specifically designed with the invention in mind in contrast to conventional approaches that require specially designed client devices.

In order to accommodate legacy device 302, the initialization protocol described above is modified to differentiate between a legacy initialization protocol that applies only to legacy device 302 and the standard initialization protocol that applies only to client devices 106-110. Such modifications to the initialization protocols can include, for example, a change in a initialization command sent over bus 102 used to start the initialization process or a special command can be sent over bus 102 that would have the effect of causing client devices 106-110 to ignore a modified initialization process and respond only to the standard initialization process.

According to an embodiment of the present invention, if host computer 104 cannot distinguish if any of the client devices are legacy type devices, then host computer 104 can broadcast a second type initialization command 304 that is only recognized by legacy device 302 if present. Client devices 106-110 (in particular client device 106, since it is the only client device capable of communicating with host 104 at this point) have been programmed to ignore any such commands. Legacy device 304 responds to second type initialization command 304 by initializing and is therefore assigned a session address. At this point, host computer 104 is programmed to recognize that the first client device to initialize is a legacy device and as part of that program broadcasts first type initialization command 128 to which client device 106-110 are programmed to respond. In this way, system 100 can accommodate insertion or removal of legacy devices without the necessity of modifying any hardware.

In another embodiment, host computer 104 can determine if there are any legacy devices on bus 102 and if such legacy devices are determined to be present, then second type initialization command 304 can be broadcast, otherwise first type initialization command 128 can be broadcast over bus 102.

Figure 4:
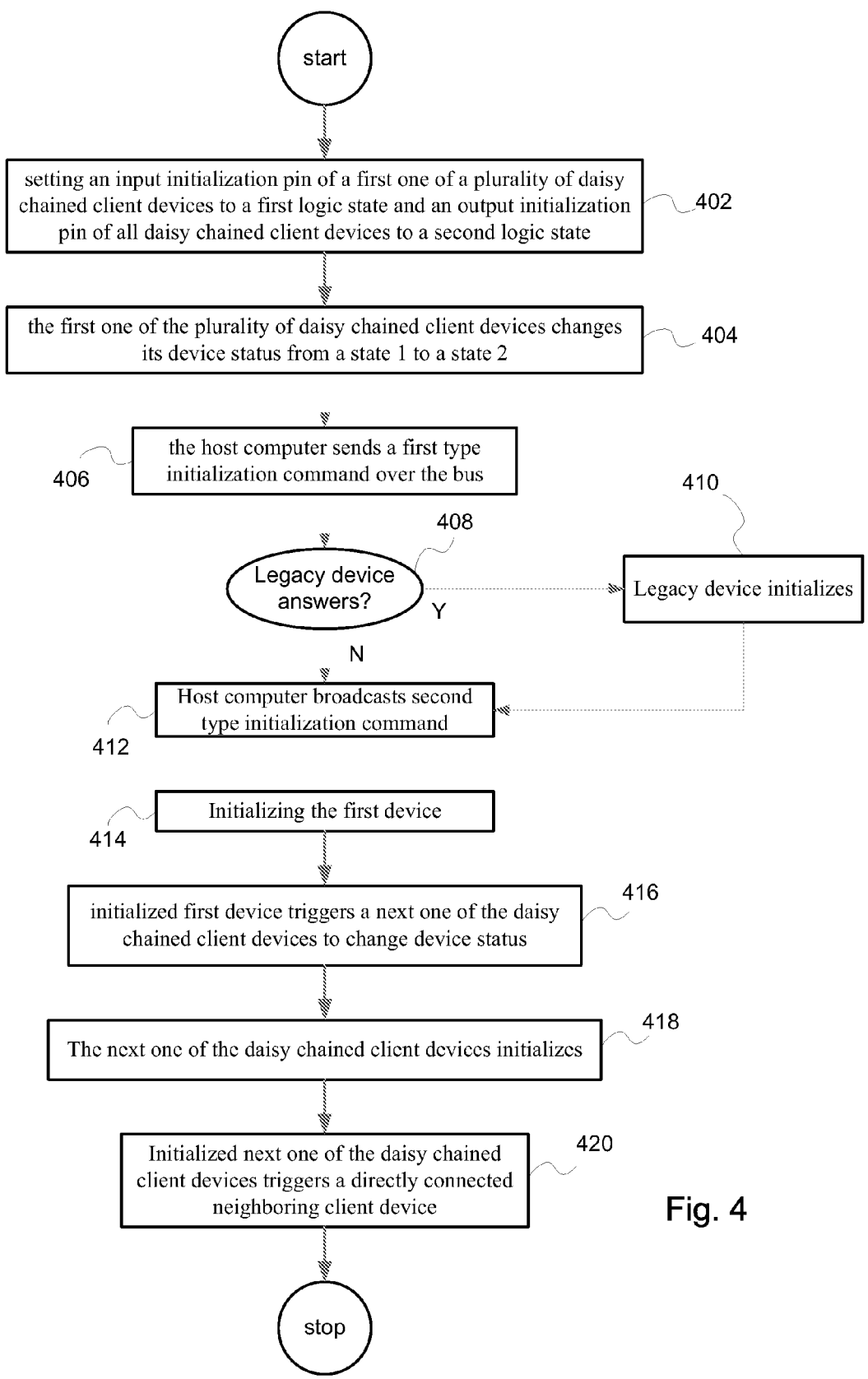
FIG. 4 shows a flowchart detailing a process for addressing multiple devices on a shared bus in accordance with an embodiment of the invention.

FIG. 4 shows a flowchart detailing a process 400 for addressing multiple devices on a shared bus in accordance with an embodiment of the invention. The process 400 begin at 402 by setting an input initialization pin of a first one of a plurality of daisy chained client devices to a first logic state and an output initialization pin of all daisy chained client devices to a second logic state. In response to 402, the first one of the plurality of daisy chained client devices changes its device status from a state 1 to a state 2 thereby enabling only the first one of the plurality of daisy chained client devices to communicate with a host computer over the shared bus at 404. At 406, the host computer sends a first type initialization command over the bus. In some embodiments, a legacy device alone will be programmed to answer the first type initialization command and initialize at 410 followed by the host computer broadcasting a second type initialization command at 412 that causes only the first client device to initialize at 414. It should be noted, however, in other embodiments, the client devices only can be programmed to respond to the first type initialization command whereas the legacy device can be programmed to respond to the second initialization command. In this way, the order of the initializing of ether client devices or legacy devices sharing the bus can be modified. For example, in some cases, a legacy device can be initialized prior to any client devices, whereas in other cases, the legacy device can be initialized after all client devices. Moreover, it is also possible that that some but not all of the client devices can be initialized followed by initialization of the legacy device after which the remaining client devices can be initialized Returning to FIG. 4, after the first client device has completed initializing, the first client device changes its device status from state 2 to state 3 and concurrently triggers a next one of plurality of daisy chained client devices connected thereto to change its device status from state 1 to state 2 at 416. The host computer sends the appropriate initialization command over the shared bus to which only the next one of the plurality of daisy chained client devices responds by initializing at 418. After the next one of the plurality of daisy chained client devices has initialized, it changes it device status from state 2 to state 3 and triggers another one of the plurality of daisy chained client devices to changes its device status from state 1 to state 2 at 420. The process 400 continues along until all daisy chained client devices have been initialized.

It should be noted that it is contemplated that the invention can be used for any type client device or any mix of types of client devices. For example, the client devices can include data storage devices, communications devices, sensing devices, and the like. It should also be noted that the legacy devices can also include data storage devices, communication devices, sensing devices and the like that can be fixed or removable. Such devices can include SDIO (Input/Output) cards used as an interface that extends the functionality of devices with SD card slots such as Bluetooth®, GPS, and WiFi (802.11b,g), etc. Data storage devices can include non-volatile memory such as Multi Media Card (MMC) and Secure Digital Card (SD).

The invention can further pertain to an electronic system that includes a memory system as discussed above. Memory systems (i.e., memory cards) are commonly used to store digital data for use with various electronics products. The memory system is often removable from the electronic system so the stored digital data is portable. The memory systems according to the invention can have a relatively small form factor and be used to store digital data for electronics products that acquire data, such as cameras, hand-held or notebook computers, network cards, network appliances, set-top boxes, hand-held or other small media (e.g., audio) players/recorders (e.g., MP3 devices), and medical monitors.

The advantages of the invention are numerous. Different embodiments or implementations may yield one or more of the following advantages. One advantage of the invention is legacy devices can be added or removed without consideration of modifying system hardware. Another advantage of the invention is that it can be used with any host computer without modification therefore reducing the cost and increasing the applicability of the invention.

The many features and advantages of the invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A bus architecture, comprising:
   at least one signal line; and
   a legacy device having I/O pins selected ones of which are connected to the at least one signal line and no initialization pins;
   a plurality of client devices wherein each of the client devices includes,
   a number of I/O pins selected ones of which are connected to the at least one signal line, and
   a first and a second initialization pin wherein all but a first of the plurality of client devices are connected to one another in a daisy chain arrangement by way of the first and the second initialization pin separate from the at least one signal line wherein the at least one signal line is connected to a host computer, wherein the first client device is connected to the daisy chain arrangement only by way of the second initialization pin and wherein the first initialization pin of the first device is not connected directly to the host computer and is independently held at a first logic level such that the first one of the plurality of client devices is always able to communicate with an external circuit connected to the at least one signal line, and wherein each of the plurality of client devices is configured to:
   receive the first logic level on the first initialization pin;
   change a device status of a current client device to an active status in response to receiving the first logic level on the first initialization pin such that the current client can receive an initialization command;
   receive the initialization command from the host computer by way of the at least one signal line;
   initialize in response to the received initialization command;
   assign a session address to the current client device, wherein if the current client has a dedicated device address and if the dedicated device address does not conflict with a previously assigned device address, then designating the dedicated device address as the session address otherwise assigning the session address to the current device by the host computer;
   change the device status to an initialized status in response to the completed initializing;
   set the second initialization pin to the first logic level in accordance with the initialized status;
   initializing the devices sharing the at least one signal line comprises:
   in any order, initializing the legacy device; and
   initializing the client devices.

2. A bus architecture as recited in claim 1, wherein the client devices are selected from a group comprising: a memory device, a sensing device, a communications device.

3. A bus architecture as recited in claim 2, wherein the memory device is a non-volatile memory that includes a MMC memory device or a SD memory device or a SDIO device.

4. A bus architecture as recited in claim 2, wherein the communications devices is a Bluetooth device or a WiFi device or WiMax device.

5. A bus architecture as recited in claim 1, wherein the host computer, the at least one signal line and the plurality of client devices are incorporated on to a printed circuit board.

6. A bus architecture as recited in claim 1, wherein the legacy device is removeably connected to a socket that in turn is connected to the at least one signal line.

7. A bus architecture as recited in claim 6, wherein when the legacy device is inserted into the socket, the host computer initializes the legacy device without initializing any of the client devices followed initializing the plurality of client devices.

8. A bus architecture as recited in claim 6, wherein when the legacy device is inserted into the socket, the host computer initializes the client devices without initializing the legacy device followed by initializing the legacy device.

9. A method of assigning session addresses to N client devices, wherein N is greater than or equal to one, each having I/O pins and a first and a second initialization pin wherein selected ones of the I/O pins are connected to at least one signal line and a legacy device having I/O pins selected ones of which are connected to the at least one signal line and no initialization pins, the method comprising:

setting the first initialization pin of a first client device to a first logic level, wherein the first initialization pin of the first client device is connected to an external circuit that is not a host computer;

changing a device status of the first client device to an active status in response to the first logic level such that the first client device can receive an initialization command;

receiving the initialization command by the first client device from the host computer by way of the at least one signal line;

if the client device has a dedicated device address, then initializing the first client device in response to the received initialization command by designating the dedicated device address as the session address as long as the dedicated session address does not conflict with a previously assigned device address, otherwise, assigning the session address to the client device by the host computer;

changing the device status of the initialized first client device to an initialized status in response to the completed initializing; and setting the second initialization pin of the initialized first client device to the first logic level in accordance with the initialized status, wherein the second initialization pin of the first device is connected to the other N−1 client devices that are, in turn, connected in a daisy chain arrangement by way of the first and the second initialization pins separate from the signal line;

initializing the devices sharing the at least one signal line comprises:

in any order, initializing the legacy device; and initializing the client devices.

10. A method as recited in claim 9, further comprising:

initializing the daisy chain arrangement having N−1 client devices, by (a) receiving the first logic level by an nth one of the N−1 client devices directly from the initialized (n−1)th client device without using the at least one signal line;

(b) initializing the nth one of the embedded client devices; and (c) repeating (a)-(b) until all N−1 client devices in the daisy chain arrangement are initialized.

11. A method as recited in claim 9, wherein any of the client devices are selected from a group that includes: a data storage device that further includes a non-volatile memory device, a communications device, a sensing device.

12. A method as recited in claim 11, wherein the memory device is a MMC memory device or a SD memory device.

13. A method as recited in claim 9, wherein the host computer provides the initialization command as needed.

14. A method as recited in claim 13, wherein the host computer, the at least one signal line and the plurality of client devices are incorporated on to a printed circuit board.

15. A method as recited in claim 9, wherein the legacy device is removeably connected to a socket incorporated onto the printed circuit board that in turn is connected to the at least one signal line.

16. A method as recited in claim 15, wherein when the legacy device is inserted into the socket, the host computer initializes the legacy device without initializing any of the client devices followed initializing the plurality of client devices.

17. A method as recited in claim 11, wherein when the legacy device is inserted into the socket, the host computer initializes the client devices without initializing the legacy device followed by initializing the legacy device.

18. A method as recited in claim 11, wherein the communications devices is a Bluetooth device.

19. A system, comprising:

a host device;

at least one signal line connected to the host device;

a legacy device having I/O pins selected ones of which are connected to the at least one signal line and no initialization pins; and a plurality of client devices wherein each of the client devices includes, a number of I/O pins selected ones of which are connected to the at least one signal line, and a first and a second initialization pin wherein all but a first of the plurality of client devices are connected to one another in a daisy chain arrangement by way of the first and the second initialization pin separate from the at least one signal line, wherein the first client device is directly connected to the daisy chain arrangement by way of the second initialization pin and wherein the first initialization pin of the first device is not connected directly to the host device and is independently held at a first logic level such that the first one of the plurality of client devices is always able to communicate with an external circuit connected to the at least one signal line and wherein each of the plurality of client devices is configured to:

receive the first logic level at the first initialization pin;

change a device status of a current client device to an active status in response to receiving the first logic level at the first initialization pin, such that the current client can receive an initialization command;

receive the initialization command from the host device by way of the at least one signal line;

initialize in response to the received initialization command, wherein the initializing includes:

assigning a session address to the current client device, wherein if the current client has a dedicated device address and if the dedicated device address does not conflict with a previously assigned device address, then designating the dedicated device address as the session address, otherwise assigning the session address to the current device by the host computer;

change the device status to an initialized status in response to the completed initializing; and set the second initialization pin to the first logic level in accordance with the initialized status;

initializing the devices sharing the at least one signal line comprises:

in any order, initializing the legacy device; and initializing the client devices.

20. A system as recited in claim 19, further comprising:

initializing the legacy device without initializing any of the client devices.

21. A system as recited in claim 19 further comprising:

initializing the plurality of client devices after the legacy device is initialized.

22. A system as recited in claim 19, further comprising:

initializing all of the client devices without initializing legacy device.

23. A system as recited in claim 22 further comprising:
initializing the legacy device after all of the client devices are initialized.

24. A method of initializing a legacy device and N client devices, wherein N is greater than or equal to one, each having I/O pins selected ones of which are connected to at least one signal line, wherein only the N client devices each have a first and a second initialization pin and wherein a first initialization pin of a first client device is connected to an external node and a second initialization pin of the first device is connected to the other N−1 client devices that are, in turn, connected in a daisy chain arrangement by way of the first and the second initialization pins separate from the signal line, the method comprising:
in any order,
initializing the legacy device; and
initializing the N client devices;
wherein the initializing the N client devices comprises:
setting the first initialization pin of the first client device to a first logic level;
changing a device status of the first client device to an active status in response to the first logic level such that the first client device can communicate with a host computer connected to the at least one signal line;
receiving an initialization command by the first client device;
initializing the first client device in response to the received initialization command by assigning the session address to the first client device comprising:
if the client device has a dedicated device address, then designating the dedicated device address as the session address as long as the dedicated session address does not conflict with a previously assigned device address, otherwise, assigning the session address to the client device;
changing the device status of the initialized first client device to an initialized status in response to the completed initializing; and
setting the second initialization pin of the initialized first client device to the first logic level in accordance with the initialized status.

25. A method as recited in claim 24, further comprising:
initializing the daisy chain arrangement having N−1 client devices, by
(a) receiving the first logic level by an nth one of the N−1 client devices directly from the initialized (n−1)th client device without using the at least one signal line;
(b) initializing the nth one of the embedded client devices; and
(c) repeating (a)-(b) until all N−1 client devices in the daisy chain arrangement are initialized.

26. A method as recited in claim 24, wherein any of the client devices or the legacy device are selected from a group that includes: a data storage device that further includes a non-volatile memory device, a communications device, a sensing device.

27. A method as recited in claim 24, wherein the external node is connected to an external circuit arranged to set the first initialization pin of the first client device to the first logic level.

28. A method as recited in claim 24, further comprising:
initializing the legacy device without initializing any of the client devices.

29. A method as recited in claim 28 further comprising:
initializing the plurality of client devices after the legacy device is initialized.

30. A method as recited in claim 24, further comprising:
initializing all of the client devices without initializing legacy device.

31. A method as recited in claim 30 further comprising:
initializing the legacy device after all of the client devices are initialized.

* * * * *